(12) United States Patent
Sager et al.

(10) Patent No.: US 10,161,322 B2
(45) Date of Patent: Dec. 25, 2018

(54) TECHNIQUES FOR CREATING PURGE VAPOR USING WASTE HEAT RECOVERY

(71) Applicants: Roger C Sager, Munith, MI (US); James Daley, Jackson, MI (US); Joseph Dekar, Jackson, MI (US); Brian L Terwedo, Okemos, MI (US); Derek R Robson, Lake Orion, MI (US); Daniel E Hornback, Davisburg, MI (US)

(72) Inventors: Roger C Sager, Munith, MI (US); James Daley, Jackson, MI (US); Joseph Dekar, Jackson, MI (US); Brian L Terwedo, Okemos, MI (US); Derek R Robson, Lake Orion, MI (US); Daniel E Hornback, Davisburg, MI (US)

(73) Assignee: FCA US LLC, Auburn Hills, MI (US)

( * ) Notice: Subject to any disclaimer, the term of this patent is extended or adjusted under 35 U.S.C. 154(b) by 58 days.

(21) Appl. No.: 15/359,679

(22) Filed: Nov. 23, 2016

(65) Prior Publication Data

US 2018/0142634 A1 May 24, 2018

(51) Int. Cl.
| | |
|---|---|
| *G01N 3/00* | (2006.01) |
| *F02D 41/00* | (2006.01) |
| *F02M 25/08* | (2006.01) |
| *F01N 5/02* | (2006.01) |
| *B01D 53/04* | (2006.01) |
| *F01N 3/10* | (2006.01) |

(52) U.S. Cl.
CPC ..... *F02D 41/0032* (2013.01); *B01D 53/0407* (2013.01); *F01N 5/02* (2013.01); *F02D 41/0045* (2013.01); *F02M 25/089* (2013.01); *F02M 25/0854* (2013.01); *B01D 2253/102* (2013.01); *B01D 2257/7022* (2013.01); *B01D 2259/4516* (2013.01); *F01N 3/101* (2013.01)

(58) Field of Classification Search
USPC ......... 60/274, 278, 282, 283, 284, 285, 286, 60/298, 320; 123/73 CC, 461, 515, 516, 123/518, 519, 520, 521, 543, 545
See application file for complete search history.

(56) References Cited

U.S. PATENT DOCUMENTS 3,738,334 A * 6/1973 Farr ...................... F02M 31/18
123/557
6,895,944 B1 5/2005 Weldon
(Continued)

*Primary Examiner* — Binh Q Tran
(74) *Attorney, Agent, or Firm* — Ralph E. Smith

(57) ABSTRACT

An evaporative emissions (EVAP) system for a vehicle includes a waste heat control valve configured to direct an exhaust gas from an exhaust treatment system, the waste heat control valve being positioned at a point downstream from a catalyst of the exhaust treatment system, a vapor canister configured to store a fuel vapor evaporated from a liquid fuel housed in a fuel tank of the vehicle, and a heat exchanger connected to (i) the fuel tank, (ii) the waste heat control valve, and (iii) the vapor canister, the heat exchanger being configured to (a) utilize the exhaust waste heat to evaporate the fuel vapor from the liquid fuel and (b) provide the evaporated fuel vapor to the vapor canister. A method of operating the EVAP system includes controlling the waste heat control valve and a fuel pump to provide the vapor canister with a desired amount of fuel vapor.

14 Claims, 3 Drawing Sheets

(56) References Cited

U.S. PATENT DOCUMENTS

| | | | |
|---|---|---|---|
| 7,114,492 B2* | 10/2006 | Reddy | F01N 5/02 |
| | | | 123/518 |
| 7,478,628 B2* | 1/2009 | Hines | F02D 41/003 |
| | | | 123/557 |
| 7,531,029 B2 | 5/2009 | Hoke et al. | |
| 8,245,671 B2* | 8/2012 | Leone | F02D 41/0027 |
| | | | 123/3 |
| 8,407,999 B2* | 4/2013 | Gray, Jr. | F01K 7/16 |
| | | | 123/1 A |
| 2001/0011539 A1* | 8/2001 | Ito | F02M 25/089 |
| | | | 123/518 |

\* cited by examiner

TECHNIQUES FOR CREATING PURGE VAPOR USING WASTE HEAT RECOVERY

FIELD

The present application generally relates to evaporative emissions (EVAP) systems and, more particularly, to techniques for creating purge vapor using waste heat recovery.

BACKGROUND

Evaporative emissions (EVAP) systems include vapor canisters that capture fuel vapor (e.g., butane) evaporated from liquid fuel (e.g., gasoline) housed in a fuel tank of a vehicle. The trapped fuel vapor is typically circulated into an air box and provided as part of an air/fuel charge that is combusted by an engine. Because the fuel vapor is highly combustible, its use during engine combustion increases engine power/efficiency. In some cases, normal refueling events and diurnal or daily hot soaks of the EVAP system, however, are not enough to evaporate and thereby capture a desired amount of fuel vapor. Accordingly, while such EVAP systems work well for their intended purpose, there remains a need for improvement in the relevant art.

SUMMARY

According to one example aspect of the invention, an evaporative emissions (EVAP) system is presented. In one exemplary implementation, the EVAP system includes a waste heat control valve configured to direct an exhaust gas from an exhaust treatment system of the vehicle, the waste heat control valve being positioned at a point downstream from a catalyst of the exhaust treatment system; a vapor canister configured to store a fuel vapor evaporated from a liquid fuel housed in a fuel tank of the vehicle; and a heat exchanger connected to (i) the fuel tank, (ii) the waste heat control valve, and (iii) the vapor canister, the heat exchanger being configured to (a) receive exhaust gas directed by the waste heat control valve and utilize heat from the exhaust gas to evaporate the fuel vapor from the liquid fuel and (b) provide the evaporated fuel vapor to the vapor canister.

In some implementations, the EVAP system further comprises a fuel pump configured to pump the liquid fuel from the fuel tank into the heat exchanger and back into the fuel tank. In some implementations, the EVAP system further comprises a controller configured to: determine an amount of the fuel vapor to be stored in the vapor canister; and control the waste heat control valve and the fuel pump based on the amount of fuel vapor to be stored in the vapor canister.

In some implementations, the controller is further configured to control the fuel pump and the waste heat control valve such that the amount of fuel vapor stored in the vapor canister is within a threshold of a desired amount of fuel vapor. In some implementations, the controller is further configured to: open the waste heat control valve and activate the fuel pump when the amount of fuel vapor stored in the vapor canister is more than the threshold less than the desired amount of fuel vapor; and close the waste heat control valve and deactivate the fuel pump when the amount of fuel vapor stored in the vapor canister is more than the threshold greater than the desired amount of fuel vapor.

In some implementations, the controller is further configured to detect a precondition where a temperature of the exhaust gas is within a predetermined temperature range for operation of the heat exchanger, wherein the opening of the waste heat control valve and activating of the fuel pump is performed in response to detecting the precondition. In some implementations, the EVAP system further comprises a temperature sensor configured to measure a temperature indicative of the exhaust gas temperature.

In some implementations, the EVAP system further comprises a purge pump configured to pump the fuel vapor from the vapor canister to an engine of the vehicle, wherein the controller is further configured to control the purge pump based on an engine operating parameter.

According to another example aspect of the invention, a method of operating an EVAP system is presented. In one exemplary implementation, the method includes controlling, by a controller, a waste heat control valve to direct an exhaust gas from an exhaust treatment system of the vehicle into a heat exchanger, the waste heat control valve being positioned at a point downstream from a catalyst of the exhaust treatment system; and controlling, by the controller, a fuel pump to pump liquid fuel from a fuel tank of the vehicle into the heat exchanger and back into the fuel tank, wherein the heat exchanger is configured to (i) utilize the heat from the exhaust gas to evaporate a fuel vapor from the liquid fuel and (ii) provide the fuel vapor to a vapor canister that stores the fuel vapor.

In some implementations, the method further comprising determining, by the controller, an amount of the fuel vapor stored in the vapor canister, wherein the controlling of the waste heat control valve and the fuel pump are performed based on the amount of fuel vapor stored in the vapor canister. In some implementations, the controlling of the waste heat control valve and the fuel pump are performed such that the amount of fuel vapor stored in the vapor canister is within a threshold of a desired amount of fuel vapor.

In some implementations, the controlling of the waste heat control valve and the fuel pump further comprises: opening the waste heat control valve and activating the fuel pump when the amount of fuel vapor stored in the vapor canister is more than the threshold less than the desired amount of fuel vapor; and closing the waste heat control valve and deactivating the fuel pump when the amount of fuel vapor stored in the vapor canister is more than the threshold greater than the desired amount of fuel vapor.

In some implementations, the method further comprises detecting, by the controller, a precondition where a temperature of the exhaust gas is within a predetermined temperature range for operation of the heat exchanger, wherein the opening of the waste heat control valve and the activating of the fuel pump is performed in response to detecting the precondition. In some implementations, the method further comprises receiving, by the controller and from a temperature sensor, a measurement of a temperature indicative of the exhaust gas temperature.

In some implementations, the method further comprises controlling, by the controller, a purge pump configured to pump the fuel vapor from the vapor canister to an engine of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, evaporated fuel vapor (e.g., butane), also known as "purge vapor," is usable during combustion to increase engine power/efficiency. Conventional EVAP systems, however, are unable to evaporate and capture a desired amount of fuel vapor. Accordingly, improved EVAP techniques are presented. These EVAP techniques utilize a heat exchanger to actively evaporate fuel vapor from liquid fuel (e.g., gasoline) housed in a fuel tank of the vehicle. The heat exchanger receives heat energy from exhaust gas at a point downstream from a catalyst (e.g., a three-way catalytic converter), which is also known as "waste heat." By utilizing waste heat from exhaust gas, this evaporation is performed without consuming other energy (e.g., electrical energy). A controller controls a fuel pump to control the flow of liquid fuel through the heat exchanger, as well as a waste heat control valve to control the flow of exhaust gas through the heat exchanger.

These EVAP systems also include a purge pump configured to pump fuel vapor that is captured in a vapor canister to the engine and a hydrocarbon (HC) sensor for measuring an amount of HC in the fuel vapor pumped by the purge pump. By implementing the purge pump and the HC sensor, these EVAP systems are configured to supply the engine with a desired amount of fuel vapor corresponding to a desired amount of HC. This is particularly useful, for example, during engine-off periods (e.g., engine cold starts) where no engine vacuum exists to supply the fuel vapor to the engine. The controller can also control the purge pump and/or purge valves at intake ports of cylinders of the engine, such as based on the measured amount of HC in the fuel vapor, to deliver a desired amount of HC to the engine.

Figure 1:
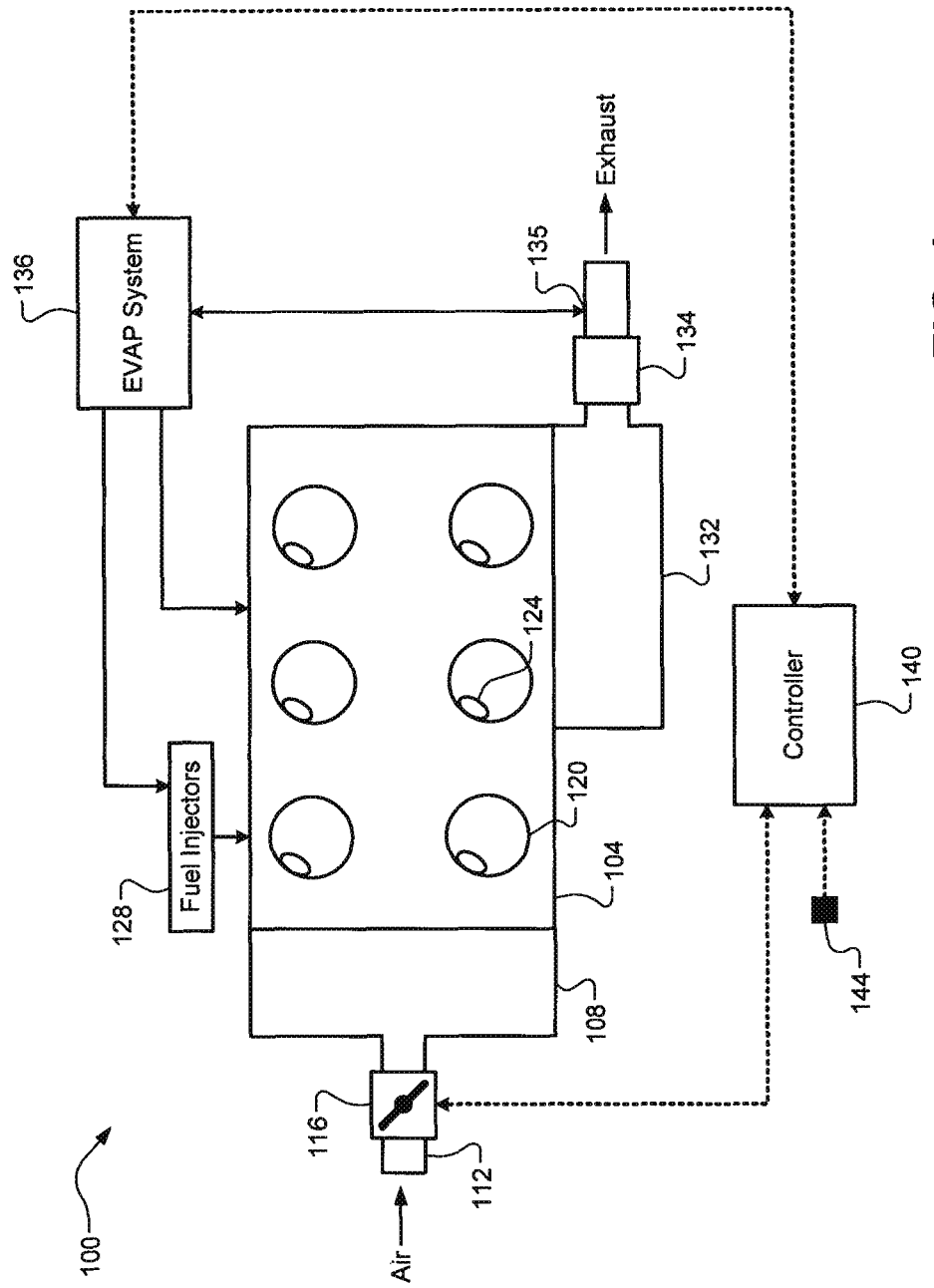
FIG. 1 is a diagram of an example engine system according to the principles of the present disclosure.

Referring now to FIG. 1, an example engine system 100 is illustrated. The engine system 100 includes an engine 104 that is configured to combust an air/fuel mixture to generate drive torque. The engine 104 is any suitable gasoline engine, such as a spark ignition (SI) engine. The engine 104 draws air into an intake manifold 108 through an induction system 112 that is regulated by a throttle valve 116. The air in the intake manifold 108 is distributed to a plurality of cylinders 120 via respective intake ports 124. While six cylinders are shown, the engine 104 could have any number of cylinders. Fuel injectors 128 are configured to inject liquid fuel (e.g., gasoline) via the intake ports 124 (port fuel injection) or directly into the cylinders 120 (direct fuel injection). While not shown, it will be appreciated that the engine 104 could include other components, such as a boost system (supercharger, turbocharger, etc.).

Intake valves (not shown) control the flow of the air or air/fuel mixture into the cylinders 120. The air/fuel mixture is compressed by pistons (not shown) within the cylinders 120 and combusted (e.g., by spark plugs (not shown)) to drive the pistons, which rotate a crankshaft (not shown) to generate drive torque. Exhaust gas resulting from combustion is expelled from the cylinders 120 via exhaust valves/ ports (not shown) and into an exhaust treatment system 132. A catalyst 134 (e.g., a three-way catalytic converter) in the exhaust treatment system 132 treats the exhaust gas before releasing it into the atmosphere after post-catalyst port 135. An EVAP system 136 selectively provides fuel vapor to the engine 104 via the intake ports 124. While delivery via the intake ports 124 is shown and discussed herein, it will be appreciated that the fuel vapor could be delivered to the engine 104 directly into the cylinders 120.

The EVAP system 136 includes at least a purge pump (not shown) and an HC sensor (not shown). The EVAP system 136 is controlled by a controller 140. The controller 140 is any suitable controller or control unit for communicating with and commanding the EVAP system 136. In one exemplary implementation, the controller 140 includes one or more processors and a non-transitory memory storing a set of instructions that, when executed by the one or more processors, cause the controller 140 to perform a specific fuel vapor delivery technique. The controller 140 is configured to receive information from one or more vehicle sensors 144. Non-limiting examples of the vehicle sensors 144 include an ambient pressure sensor, an altitude or barometric pressure sensor, an engine coolant temperature sensor, and a key-on sensor.

Figure 2:
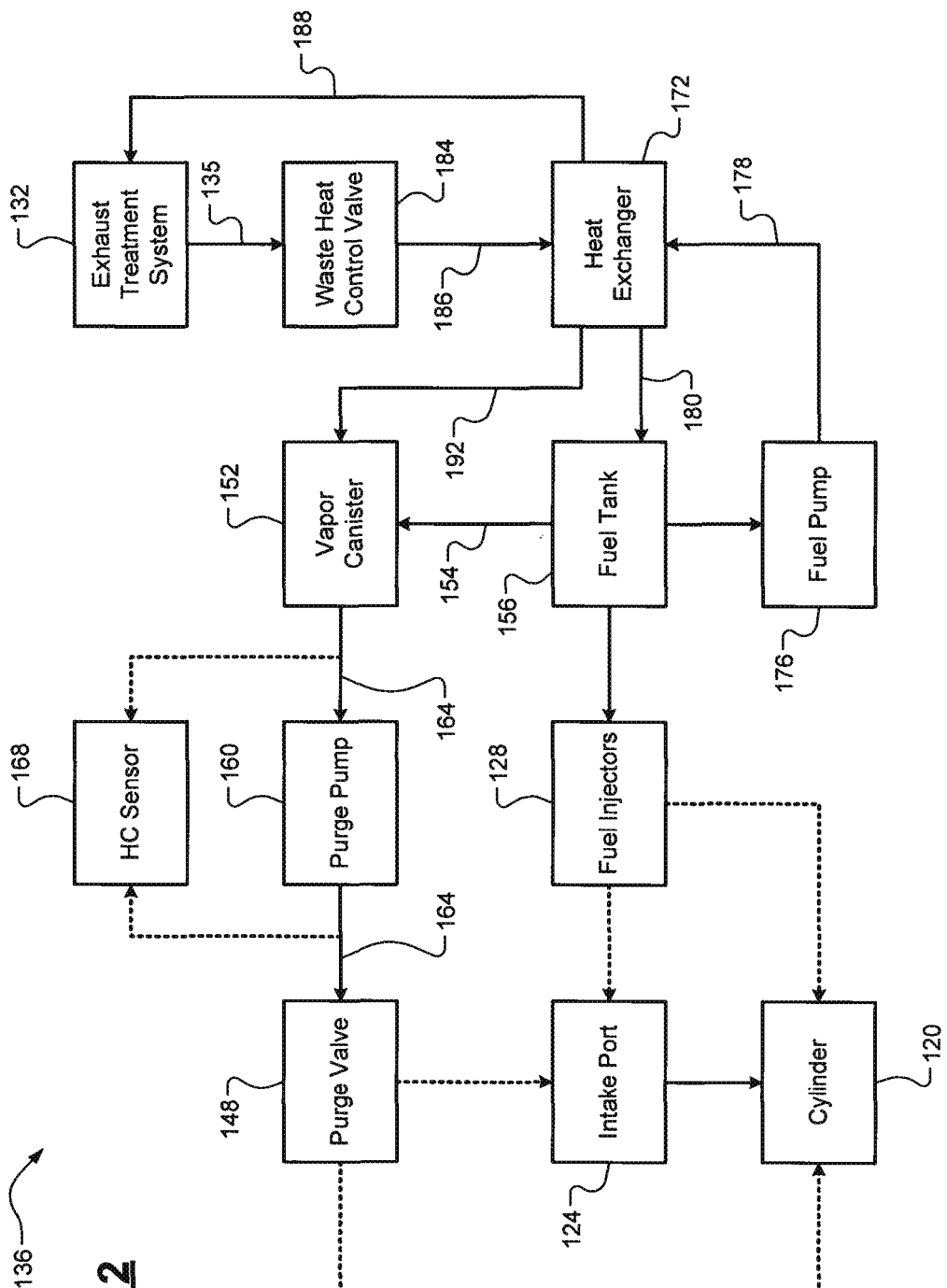
FIG. 2 is a functional block diagram of an example evaporative emissions (EVAP) system according to the principles of the present disclosure.

Referring now to FIG. 2, a functional block diagram of an example configuration of the EVAP system 136 is illustrated. While the EVAP system 136 is only shown with respect to a single intake port 124 and single cylinder 120 of the engine 104, it will be appreciated that the fuel vapor could be supplied to all of the intake ports 124 and/or cylinders 120. The EVAP system 136 is configured to deliver fuel vapor to the intake ports 124 of the engine 104 via purge valves 148. For example, the purge valves 148 could be disposed within holes or apertures in a wall of the intake ports 124. As previously mentioned, it will be appreciated that the purge valves 148 could be configured to deliver the fuel vapor directly to the cylinders 108, e.g., via different holes or apertures. One example of the purge valves is a butterfly-type valve, but it will be appreciated that any suitable valve configured to regulate the flow of pressurized fuel vapor could be utilized.

The EVAP system 136 includes a vapor canister 152 that traps fuel vapor (e.g., butane) that evaporates from liquid fuel (e.g., gasoline) housed in a fuel tank 156. This fuel vapor can be directed from the fuel tank 156 to the vapor canister via an evaporation line or duct 154. This is also referred to as passive evaporation, which is different than the active evaporation techniques discussed in greater detail below. In one exemplary implementation, the vapor canister includes (e.g., is lined with) activated carbon (e.g., charcoal) that adsorbs the fuel vapor. While not shown, the vapor canister 152 could further include a vent device (e.g., a valve) that allows fresh air to be drawn through the vapor canister 152, thereby pulling the trapped fuel vapor with it. As previously discussed, conventional EVAP systems utilize engine vacuum to draw this fresh air (and trapped fuel vapor) through the system for engine delivery.

In the illustrated EVAP system 136, a purge pump 160 is configured to selectively pump the fuel vapor from the vapor canister 152 through vapor lines 164 to the intake ports 124 (via the purge valves 148). This pumping could be in conjunction with or without the use of drawn fresh air through the vapor canister 152. The purge pump 160 could be any suitable pump configured to pump the fuel vapor from the vapor canister 152 through vapor lines 164. An HC sensor 168 is disposed in the vapor lines 164 and configured to measure an amount of HC in the fuel vapor pumped by the purge pump 160. As shown, the HC sensor 168 could measure the amount of HC flowing into and/or out of the purge pump 160. The measured amount of HC is indicative of an amount of the fuel vapor that is combustible. Rather, the HC in the fuel vapor represents the highly combustible component of the fuel vapor.

As the purge valves 148 regulate the flow of the fuel vapor into the engine 104, the controller 140 is configured to control at least one of the purge pump 160 and the purge valves 148 to deliver the desired amount of fuel vapor to the engine 104. The control of the purge pump 160 could include controlling its rotational speed. The control of the purge valves 148, on the other hand, could include controlling their angular opening. For example, there may be a high amount of HC present in highly pressurized fuel vapor in the vapor lines 164, and thus the controller 148 may primarily actuate the purge valves 148 to deliver the desired amount of fuel vapor. In many situations, however, the controller 160 will perform coordinated control of both the purge pump 160 and the purge valves 148 to deliver the desired amount of fuel vapor (e.g., a desired amount of HC) to the engine 104.

By delivering this highly combustible fuel vapor to the engine 104, combustion improves and emissions decrease. As previously discussed, the controller 140 is also configured to control the fuel injectors 128 to deliver the liquid fuel from the fuel tank 156 to the engine 104. This liquid fuel injection could be either port fuel injection or direct fuel injection. In one exemplary implementation, the controller 140 is further configured to control the fuel injectors 128 to deliver the liquid fuel from the fuel tank 156 after a period of controlling at least one of the purge pump 160 and the purge valves 148 to deliver the desired amount of fuel vapor to the engine 104. This period, for example only, could be a cold start of the engine 104.

As mentioned above, there is both passive evaporation of the fuel vapor from the fuel tank 156, as well as active evaporation. In active evaporation, liquid fuel is drawn from the fuel tank 156 by a fuel pump 176 and provided to a heat exchanger 172 via fuel supply line 178. In one exemplary implementation, the heat exchanger 172 is a type of waste heat recovery unit (WHRU), such as a double-wall coil heat exchanger. In one exemplary implementation, the fuel pump 176 is a separate fuel pump than a primary fuel pump (not shown) of the engine system 100. It will be appreciated, however, that the same fuel pump could be used for both tasks. A waste heat control valve 184 draws exhaust gas from the exhaust treatment system 132 via the post-catalyst port 135. The waste heat from the exhaust gas is provided to the heat exchanger 172 via exhaust supply line 186 and utilized to heat a refrigerant (which, in turn, heats the liquid fuel) to evaporate fuel vapor therefrom. This fuel vapor is then provided to the vapor canister 152 via vapor line 192, and the liquid fuel is then returned to the fuel tank 180 via fuel return line 180. The exhaust gas is also returned to the exhaust treatment system 132 via exhaust return line 188.

Various preconditions could be implemented for operating the EVAP system 136. In one exemplary implementation, the controller 140 is configured to control at least one of the purge pump 160 and the purge valves 148 based on a measured ambient temperature. Another exemplary precondition is detecting a key-on event of the vehicle. For example, these preconditions could be indicative of a cold start of the engine 104. Other exemplary preconditions could also be utilized, such as the rotational speed of the purge pump 160 reaching a desired level (e.g., where adequate pumping can occur) and the HC sensor 168 being turned on. Another exemplary precondition could include the HC sensor 168 measuring an amount of HC greater than a minimum threshold for combustion by the engine 104. In other words, if there is too little HC in the fuel vapor, there could be no combustion benefit by delivering the fuel vapor to the engine 104.

Similarly, various conditions could be required for actively evaporating fuel vapor. The exhaust gas provided to the heat exchanger 172, for example, must be within a specific temperature range to ensure proper evaporation and to avoid potential damage to the heat exchanger 172. Cold exhaust gas (e.g., upon starting a cold engine) will similarly provide little to no evaporative energy. The exhaust gas temperature and/or the temperature of the catalyst 134 are either measured (e.g., using a coolant temperature sensor) or modeled based on other known parameters to determine whether the exhaust gas temperature is within this specific temperature range. The amount of fuel vapor stored in the vapor canister 152 is another potential condition for performing active evaporation. More particularly, there may be a minimum threshold of fuel vapor that must be maintained in the vapor canister 152. When within a threshold of this minimum threshold, active evaporation could be enabled. The amount of fuel vapor in the vapor canister 152 is similarly measured (e.g., based on the HC sensor 168 readings) or modeled based on other known parameters.

Figure 3:
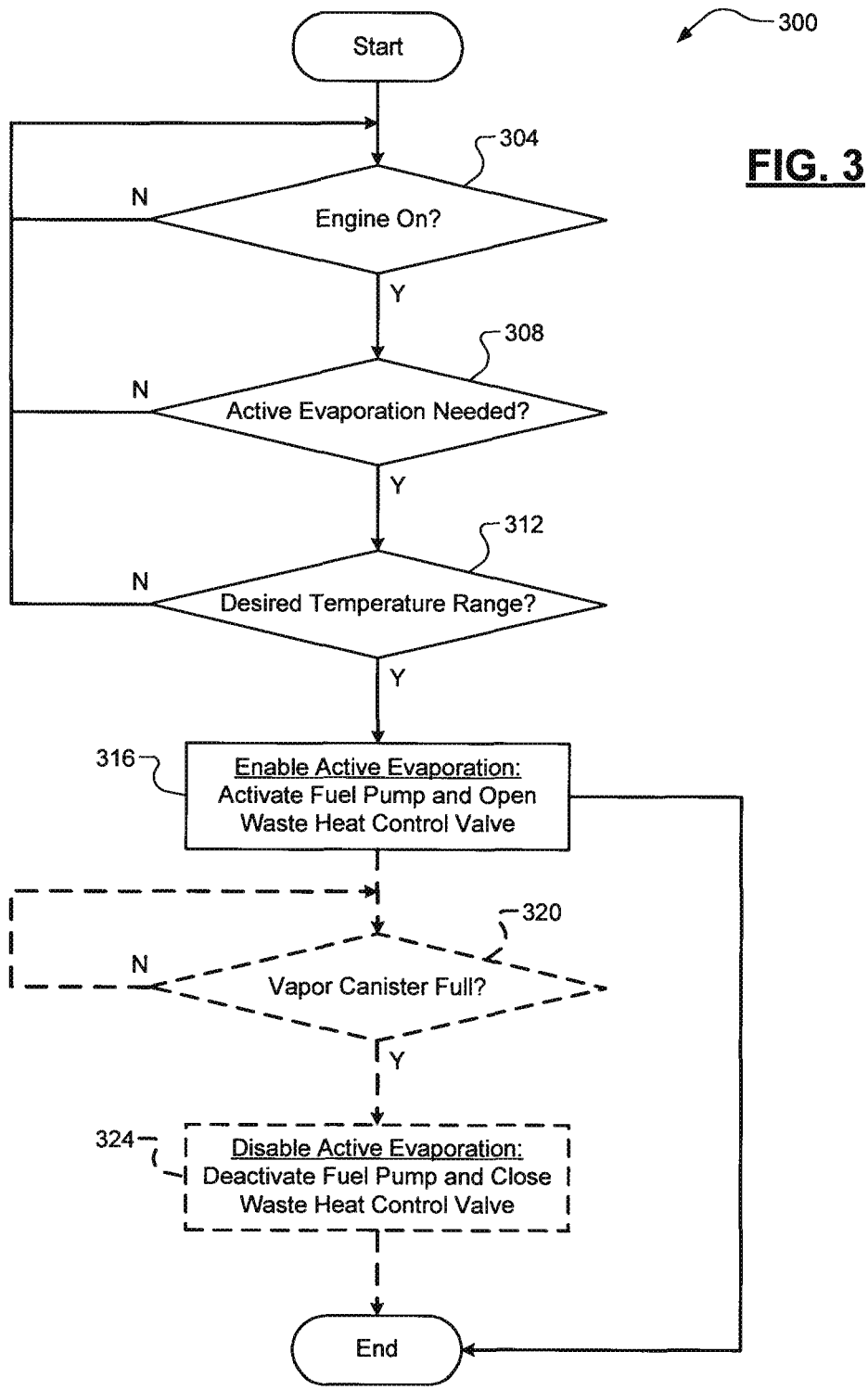
FIG. 3 is a flow diagram of an example method of operating an EVAP system according to the principles of the present disclosure.

Referring now to FIG. 3, a flow diagram of an example method 300 of operating an EVAP system (e.g., the EVAP system 136) is illustrated. At 304, the controller 140 determines whether the engine 104 is on. If true, the method 300 proceeds to 308. Otherwise, the method 300 ends or returns to 304. At 308, the controller 140 determines whether active evaporation is required. In one exemplary implementation, this includes determining whether the amount of fuel vapor stored in the vapor canister is more than the threshold less than a desired amount of fuel vapor. If true, active evaporation is required and the method 300 proceeds to 312. Otherwise, active evaporation is not required and the method 300 ends or returns to 304. At 312, the controller 140 determines whether the exhaust gas temperature, catalyst temperature, and/or other suitable temperature (e.g., coolant temperature via sensor(s) 144) is/are within a desired temperature range. This desired temperature range represents a temperature range that ensures proper operation of and avoids potential damage to the heat exchanger 172. If true, the method 300 proceeds to 316. Otherwise, the method 300 ends or returns to 304.

At 316, the controller 140 performs active evaporation by controlling both the fuel pump 176 (e.g., activating the fuel pump 176) and the waste heat control valve 184 (e.g., opening the valve 184) to draw liquid fuel and exhaust gas through the heat exchanger 172 for evaporation of the fuel vapor. In some implementations, this control is closed-loop feedback control (e.g., based on temperature or the amount of fuel vapor in the vapor canister 152). In other words, a degree of opening of the waste heat control valve 184 could be controlled, and similarly a speed of the fuel pump 176 could be controlled. While shown and described as a single step 316, it will be appreciated that this control could be divided into two separate steps/controls. The method 300 then ends or returns to 304. For example, it could be determined at optional 320 that the amount of fuel vapor in the vapor canister 152 is more than the threshold (or a different threshold) greater than the desired amount of fuel vapor (e.g., to prevent an over-fill). Such a determination could lead to the deactivating of the fuel pump 176 and closing of the waste heat control valve 184 at optional 324.

As previously discussed, it will be appreciated that the term "controller" as used herein refers to any suitable control device, control unit, or set of multiple control devices/units that is/are configured to perform at least a portion of the techniques of the present disclosure. Non-limiting examples include an application-specific integrated circuit (ASIC), a computing device comprising one or more processors and a non-transitory memory having instructions stored thereon that, when executed by the one or more processors, cause the computing device to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An evaporative emissions (EVAP) system for a vehicle, the EVAP system comprising:
   a waste heat control valve configured to direct an exhaust gas from an exhaust treatment system of the vehicle, the waste heat control valve being positioned at a point downstream from a catalyst of the exhaust treatment system;
   a vapor canister configured to store a fuel vapor evaporated from a liquid fuel housed in a fuel tank of the vehicle;
   a heat exchanger connected to (i) the fuel tank, (ii) the waste heat control valve, and (iii) the vapor canister, the heat exchanger being configured to (a) receive exhaust gas directed by the waste heat control valve and utilize heat from the exhaust gas to evaporate the fuel vapor from the liquid fuel and (b) provide the evaporated fuel vapor to the vapor canister; and
   a fuel pump configured to pump the liquid fuel from the fuel tank into the heat exchanger and back into the fuel tank.

2. The EVAP system of claim 1, further comprising a controller configured to:
   determine an amount of the fuel vapor to be stored in the vapor canister; and
   control the waste heat control valve and the fuel pump based on the amount of fuel vapor to be stored in the vapor canister.

3. The EVAP system of claim 2, wherein the controller is further configured to control the fuel pump and the waste heat control valve such that the amount of fuel vapor stored in the vapor canister is within a threshold of a desired amount of fuel vapor.

4. The EVAP system of claim 3, wherein the controller is further configured to:
   open the waste heat control valve and activate the fuel pump when the amount of fuel vapor stored in the vapor canister is more than the threshold less than the desired amount of fuel vapor; and
   close the waste heat control valve and deactivate the fuel pump when the amount of fuel vapor stored in the vapor canister is more than the threshold greater than the desired amount of fuel vapor.

5. The EVAP system of claim 4, wherein the controller is configured to detect a precondition where a temperature of the exhaust gas is within a predetermined temperature range for operation of the heat exchanger, wherein the opening of the waste heat control valve and activating of the fuel pump is performed in response to detecting the precondition.

6. The EVAP system of claim 5, further comprising a temperature sensor configured to measure a temperature indicative of the exhaust gas temperature.

7. The EVAP system of claim 1, further comprising a purge pump configured to pump the fuel vapor from the vapor canister to an engine of the vehicle, wherein the controller is further configured to control the purge pump based on an engine operating parameter.

8. A method of operating an evaporative emissions (EVAP) system of a vehicle, the method comprising:
   controlling, by a controller, a waste heat control valve to direct an exhaust gas from an exhaust treatment system of the vehicle into a heat exchanger, the waste heat control valve being positioned at a point downstream from a catalyst of the exhaust treatment system; and
   controlling, by the controller, a fuel pump to pump liquid fuel from a fuel tank of the vehicle into the heat exchanger and back into the fuel tank,
   wherein the heat exchanger is configured to be controlled to (i) utilize the heat from the exhaust gas to evaporate fuel vapor from the liquid fuel and (ii) provide the fuel vapor to a vapor canister to store the fuel vapor.

9. The method of claim 8, further comprising determining, by the controller, an amount of the fuel vapor stored in the vapor canister, wherein the controlling of the waste heat control valve and the fuel pump are performed based on the amount of fuel vapor stored in the vapor canister.

10. The method of claim 9, wherein the controlling of the waste heat control valve and the fuel pump are performed such that the amount of fuel vapor stored in the vapor canister is within a threshold of a desired amount of fuel vapor.

11. The method of claim 10, wherein the controlling of the waste heat control valve and the fuel pump further comprises:
   opening the waste heat control valve and activating the fuel pump when the amount of fuel vapor stored in the vapor canister is more than the threshold less than the desired amount of fuel vapor; and
   closing the waste heat control valve and deactivating the fuel pump when the amount of fuel vapor stored in the vapor canister is more than the threshold greater than the desired amount of fuel vapor.

12. The method of claim 11, further comprising detecting, by the controller, a precondition where a temperature of the exhaust gas is within a predetermined temperature range for operation of the heat exchanger, wherein the opening of the waste heat control valve and the activating of the fuel pump is performed in response to detecting the precondition.

13. The method of claim 12, further comprising receiving, by the controller and from a temperature sensor, a measurement of a temperature indicative of the exhaust gas temperature.

14. The method of claim 8, further comprising controlling, by the controller, a purge pump configured to pump the fuel vapor from the vapor canister to an engine of the vehicle.

* * * * *